(12) United States Patent
Gustafsson

(10) Patent No.: US 8,133,394 B2
(45) Date of Patent: Mar. 13, 2012

(54) METHOD FOR PURIFYING WASTEWATER

(75) Inventor: Bert Gustafsson, Karlskrona (SE)

(73) Assignee: B G Consulting HB, Karlskrona (SE)

( * ) Notice: Subject to any disclaimer, the term of this patent is extended or adjusted under 35 U.S.C. 154(b) by 484 days.

(21) Appl. No.: 12/309,247

(22) PCT Filed: Jul. 13, 2007

(86) PCT No.: PCT/SE2007/050525
§ 371 (c)(1),
(2), (4) Date: Apr. 9, 2009

(87) PCT Pub. No.: WO2008/010770
PCT Pub. Date: Jan. 24, 2008

(65) Prior Publication Data
US 2009/0301966 A1 Dec. 10, 2009

(30) Foreign Application Priority Data
Jul. 17, 2006 (SE) ........................................ 0601567

(51) Int. Cl.
C02F 1/52 (2006.01)

(52) U.S. Cl. ........ 210/631; 210/624; 210/709; 210/713; 210/744

(58) Field of Classification Search .................... 210/631
See application file for complete search history.

(56) References Cited

U.S. PATENT DOCUMENTS
5,667,689 A * 9/1997 Graves .......................... 210/621
6,190,034 B1 2/2001 Nielsen et al.
6,475,381 B1 11/2002 Gustafsson FOREIGN PATENT DOCUMENTS
WO WO 2005/003040 1/2005
* cited by examiner Primary Examiner — Peter A Hruskoci
(74) Attorney, Agent, or Firm — Breiner & Breiner, LLC

(57) ABSTRACT

Wastewater can be purified in a device, which includes a cup-shaped vessel, having a wastewater inlet tube for the water at a certain level and an outlet tube at a lower level than the inlet tube, and a horizontal distribution disc, which vertically divides the vessel, has at least one opening and is provided with a substantially vertical distribution tube for receiving the water from the inlet tube. Water above the distribution disc is pumped through a filter head with a filter. Filtered water is let out through the outlet tube, whereas unfiltered water is transferred back to the distribution tube. Flocculation agent is added to the unfiltered water before reaching the distribution tube.

4 Claims, 2 Drawing Sheets

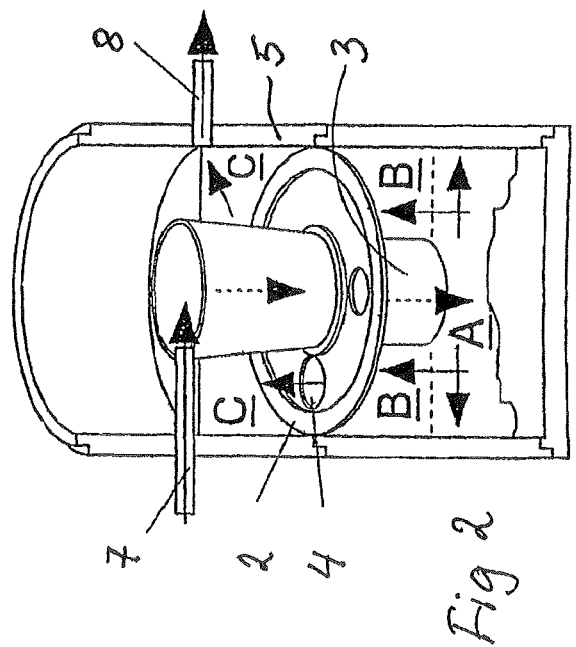
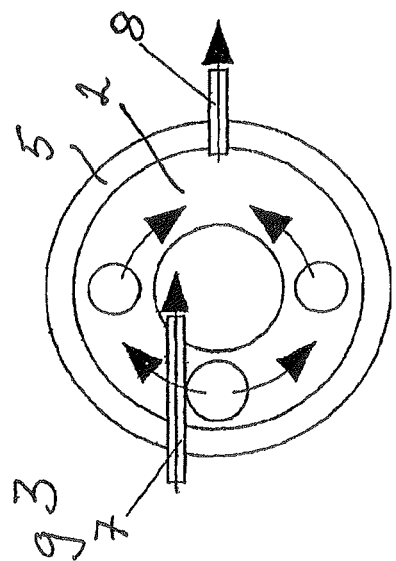
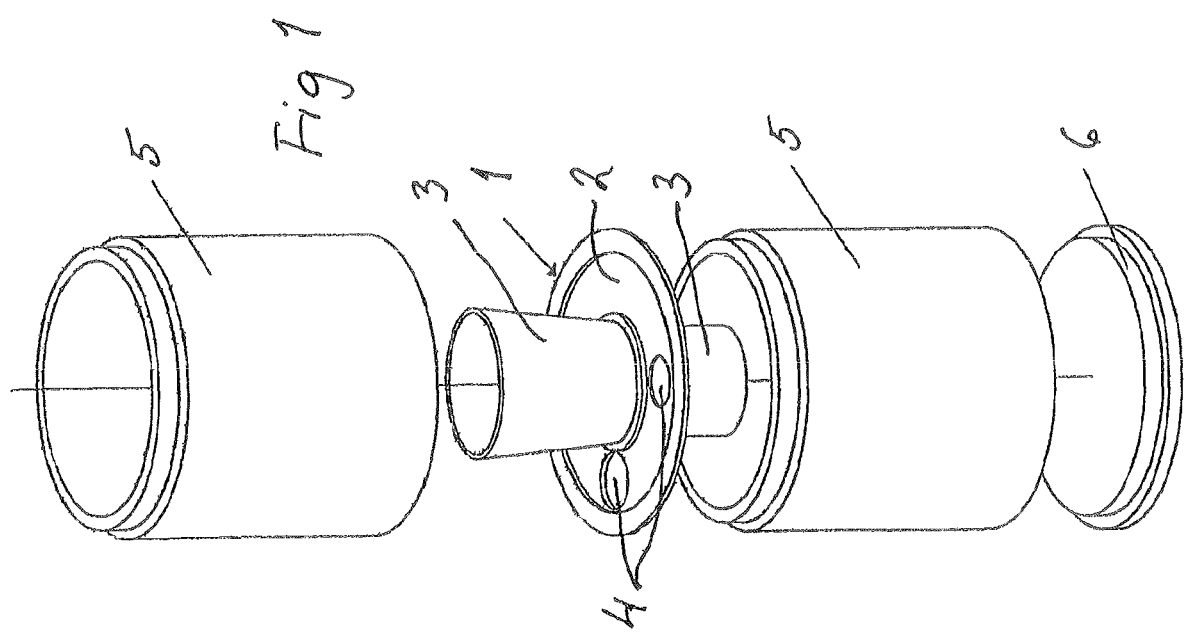

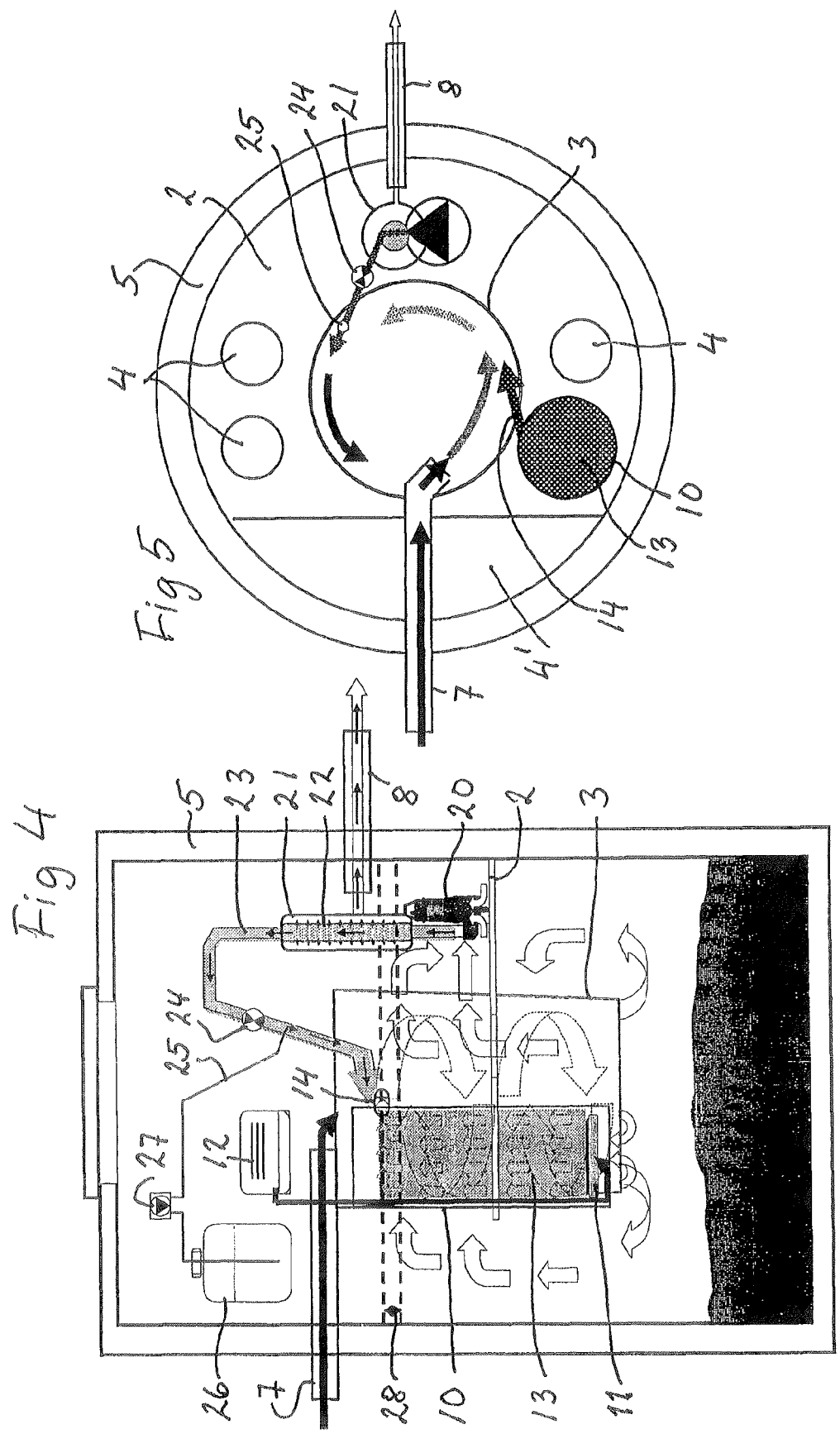

METHOD FOR PURIFYING WASTEWATER

TECHNICAL FIELD

The present invention relates to a method for purifying wastewater in a device, comprising a cup-shaped vessel, which has a wastewater inlet tube for the water at a certain level and an outlet tube at a lower level than the inlet tube, and a horizontal distribution disc, which vertically divides the vessel, has at least one opening and is provided with a substantially vertical distribution tube for receiving the water from the inlet tube and for liquid contact between the vessel portions above and below the distribution disc.

It also relates to the device.

BACKGROUND OF THE INVENTION

A device of three-chamber type for purifying wastewater is known through WO 00/04972. The device is a favorable alternative to an ordinary septic tank, which accomplishes a mechanical purification of wastewater supplied to it. Sludge and sediments are gathered on the bottom of the device and have to be removed at intervals.

Although the device is effective in its intended function, the demands on cleaning or purification are increasing, also on smaller plants intended for one or a few households.

In order to improve the purification, it may be necessary to go to chemical purification, where a flocculation agent or precipitation agent is added to the wastewater in a controlled way.

The main object of the invention is thus to modify the existing device so as to enable a chemical purification.

THE INVENTION

This according to the invention attained in that water above the distribution disc is pumped through a filter head with a filter, that filtered water is let out through the outlet tube, that reject water from the filler is transferred back to the distribution tube, and that flocculation agent is added to the unfiltered water before reaching the distribution tube.

It is of importance to optimize the action of the filter, so that the accept pumped out through the outlet is filtered to a satisfactory degree and has an optimal flow. This is obtained in that the counter-pressure in the filler is controlled by a valve in a reject conduit to the distribution tube.

In order to add a proper amount of flocculation agent in relation to the volume of water pumped out from the device, the operation of a water pump for pumping water through the filter head and of a dosing pump in a tubing for flocculation agent is controlled by a level switch in the vessel, such that the pumps are operated when a higher water level in the vessel has been reached and until a lower water level has again been reached.

By the method defined above, it is thus possible to obtain a chemical purification. In certain cases it may be desired to also obtain a biological purification. This may according to the invention be attained in that water below the distribution disc is biologically treated with bacteria in a bioreactor and is returned to the distribution tube.

A device for carrying out the method defined above for obtaining a chemical purification may according to the invention be characterized by a water pump and a filler head arranged on the distribution disc, the outlet tube being connected to the filler head downstream a filter therein, by a reject conduit for reject water from the filter leading to the distribution tube, and by means for adding flocculation agent to the reject conduit.

The reject conduit is preferably provided with a controllable valve for controlling the counter-pressure in the filter.

The means for adding flocculation agent to the reject conduit may comprise a tank for the agent, a tubing, and a dosing pump.

A level switch for controlling the operation of the water pump and the dosing pump is preferably arranged in the vessel.

If not only a chemical but also a biological purification is desired, a bioreactor, which contains water purifying bacteria, preferably on a carrier material, such as zeolite, and in its lower end has an air nozzle for oxygenating water admitted at this lower end, may be arranged in the distribution disc with its lower end below the latter.

An air pump for delivering air to the nozzle has in that case to be provided, as well as a reactor conduit connecting the upper part of the bioreactor with the distribution tube.

THE DRAWINGS

The invention will be described in further detail below under reference to the accompanying drawings, in which FIG. 1 is an exploded view of elements forming a previously known septic tank, FIG. 2 is a schematic view of the previously known septic tank in mounted condition, FIG. 3 is a top view corresponding to FIG. 2, FIG. 4 is a schematic section through a device according to the invention, and FIG. 5 is a top view of the same.

DETAILED DESCRIPTION OF AN EMBODIMENT

A previously known septic tank or "device of three-chamber type for purifying liquid" is shown in FIGS. 1-3. The Figures may also be found in WO 00/04972, disclosing the septic tank.

A distribution insert 1 consists of a horizontal distribution disc 2 and a vertical distribution tube 3 with a through hole. The distribution disc 2 is provided with a number of openings 4. (These openings 4 may be circular, as is shown in FIG. 3, but may have other shapes, as is shown in FIG. 5 at 4'.)

The distribution insert 1 is to be mounted in an outer vessel, for example two well rings or well pipes 5 and a bottom 6, as is shown in FIG. 1.

The completed septic tank is very schematically illustrated in FIG. 2. An inlet tube 7 is arranged to supply sewage water to be purified to the top of the distribution tube 3, and an outlet tube 8 is arranged in the vessel 5 at a level under the inlet tube 7.

The fluid flow in the septic tank of FIGS. 1 and 2 is as follows and is indicated by arrows therein. After entering through the inlet tube 7 the sewage water or wastewater will flow down through the distribution tube 3 towards the bottom of the vessel, where sludge is collected. The water will flow upwards through the openings in the distribution disc 2 and then to the outlet tube 8.

Three chambers corresponding to the three chambers in a classical septic tank will hereby be formed: a first chamber A in the distribution tube 3 and in the vessel 5 up to the level of the lower end of the distribution tube 3, a second chamber B in the vessel from this level up to the distribution disc 2, and a third chamber C above the distribution disc 2.

The now briefly described septic tank has numerous advantages in relation to classical septic tanks, as is revealed in the publication mentioned above.

A certain improvement of this basic septic tank was shown and described in the publication mentioned above, and the invention primarily deals with another improvement. The two improvements may be combined. Reference is now made to FIGS. 4 and 5, showing a device with both improvements.

As was shown and described in WO 00/04972, the septic tank of FIGS. 1 and 2 may be supplemented with a bioreactor 10 attached to and extending through the distribution disc 2 (so that its lower part is in the chamber B, FIG. 2).

The reactor 10 has a generally cylindrical housing with inlet openings for sewage water in the bottom. In the lower part of the reactor there is an air nozzle 11. Air is provided to the air nozzle 11 from an air pump 12, suitably positioned in the vessel 5 above the liquid level therein. The purpose of the air nozzle 11 is to oxygenate the passing liquid, before it continues to the upper part in the reactor 10.

The upper main part of the reactor 10 contains a suitable carrier material 13 for bacteria active in purification in sewage treatment plants. These bacteria will form a layer or film on the carrier material 13, which may be crushed zeolite or the like.

When mounted in the distribution disc 2, the reactor 10 is connected at its upper part to the upper part of the distribution tube 5 by means of a reactor conduit 14.

The function of the so far described device or sewage treatment plant is as follows: Sewage or wastewater is supplied to the distribution tube 3 through the inlet tube 7. Sludge will be deposited on the bottom of the vessel. By the pumping action of the air nozzle 11, liquid will be continuously circulated through the reactor 10 and the conduit 14 and again to the distribution tube 3. Biological purification of the liquid will occur in the reactor 10.

The reactor 10 with its content of bacteria will function as an efficient bioreactor for the oxygenated liquid pumped through it. A good biological reduction of BOD, COD, proteins, etc is obtained. Also conditions for a good nitrification and thus a high biological reduction of nitrogen have been created.

In order to improve the so far described device for purifying sewage or wastewater and to develop it into a chemical water purifying device, it is supplemented in the following way:

An electric water pump 20 is mounted on the distribution disc 20 for sucking water above this disc (in chamber C, FIG. 2). The pump 20 is provided a filler head 21 connected to the outlet tube 8. The filter head 21 has a filter, preferably in the form of a replaceable tubular filler-tube 22, and only cleaned water that has passed the filter-tube 22 will pass out through the outlet tube 8.

A reject conduit 23 connects the filler head 21 to the top of the distribution tube 3. The counter-pressure in the filler-tube 22 may be controlled by means of a controllable valve 24 on the reject conduit 23. In this way it is possible to control the volume of water passing out through the filter-tube 22 and the outlet tube 8 ("the accept" to a recipient (not shown) for the water and thus "the reject" going back for continued treatment.

After or downstream the valve 24 the reject conduit 23 receives a tubing 25 from a tank 26 for flocculation agent (precipitation agent). The agent may aluminum chloride or iron chloride, as is known in the art. The tubing 25 is provided with a dosing pump 27, controlled by a level switch 28, which also controls the pump 20. When a higher liquid level in the vessel 5 has been reached, the water pump 20 and the dosing pump 27 will start and operate, until a lower liquid level has been attained again.

As the reject is returned to the distribution tube 3, at the same lime as flocculation agent is supplied in proportion to the water volume expelled by pumping, which is controlled by the level switch 28, a flow-proportional mixing of the flocculation agent is attained. The distribution tube 3 has herewith the function of a mixing chamber, where a water rotation is created at pumping.

Contaminants (including phosphor) will sink to the bottom of the device. Emptying of the device from sludge and contaminants can occur once or twice a year.

A critical contaminant in water leaving a purification plant is phosphor. It has appeared that the device according to the invention is capable of removing 90-95% of phosphor from wastewater and that this favorable result may be attained in a plant at a much lower cost than a conventional one.

By the invention, a chemical purification stage is added to a previously known device. This new stage can be added to the device with only mechanical purification or to the device also with biological purification. In the latter case the obtained purification is optimal.

The invention claimed is:

1. A method for purifying wastewater in a device, said device comprising a cup-shaped vessel which has a wastewater inlet tube for water at a predetermined level and an outlet tube at a lower level than the inlet tube, and a horizontal distribution disc, which vertically divides the vessel, having at least one opening and being provided with a substantially vertical distribution tube for receiving the water from the inlet tube and for liquid contact between portions of the vessel which are above and below the distribution disc, wherein said method comprises supplying said wastewater to said inlet tube and through said distribution tube, depositing sludge on a bottom of the vessel, pumping water through and above the distribution disc through a filter head with a filter to provide filtered water and sinking contaminants from said wastewater to the bottom of the vessel, allowing the filtered water to be let out through the outlet tube, transferring reject water from the filter back to the distribution tube, and adding flocculation agent to the reject water before the reject water reaches the distribution tube.

2. The method according to claim 1, wherein counter-pressure in the filter is controlled by a valve in a reject conduit to the distribution tube.

3. The method according to claim 1, wherein operation of a water pump for said pumping of the water through the filter head and operation of a dosing pump in a tubing for the flocculation agent is controlled by a level switch in the vessel, such that the water pump and the dosing pump are operated when a predetermined higher water level in the vessel has been reached and until a predetermined lower water level has again been reached.

4. The method according to claim 1, wherein water present below the distribution disc is biologically treated with bacteria in a bioreactor and returned to the distribution tube.

\* \* \* \* \*